3,278,521
HYDROXYPROPYL CELLULOSE AND PROCESS
Eugene D. Klug, Wilmington, Del., assignor to Hercules Incorporated, a corporation of Delaware
No Drawing. Filed Feb. 8, 1963, Ser. No. 257,064
14 Claims. (Cl. 260—231)

The present invention relates to hydroxypropyl cellulose having unexpected beneficial properties and process of preparing same.

In accordance with the present invention hydroxypropyl cellulose having unexpected beneficial properties is prepared by carrying out the process which comprises mixing cellulosic material, alkali, water and a water-miscible inert organic diluent, removing excess liquid from the resulting alkali cellulose, and then causing the alkali cellulose to react with propylene oxide. Preferably the M.S. of the hydroxypropyl cellulose product is 2–10, the excess liquid is removed to a press ratio of 2–5 and the alkali/cellulose ratio is .02–.5. According to specifically preferred conditions the M.S. is 3–5, the excess liquid is removed to a press ratio of 2.5–3.5 and the alkali/cellulose ratio is .05–.15.

The purpose of the following three paragraphs is to explain the use herein and in the prior art of the terms "degree of substitution" ("D.S.") and "M.S."

There are three hydroxyl groups in each anhydroglucose unit in the cellulose molecule. D.S. is the average number of hydroxyl groups substituted in the cellulose per anhydroglucose unit. M.S. is the average number of moles of reactant combined with the cellulose per anhydroglucose unit. For the alkyl, carboxyalkyl, or acyl derivatives of cellulose, the D.S. and M.S. are the same. For the hydroxyalkyl derivatives of cellulose, the M.S. is generally greater than the D.S. The reason for this is that each time a hydroxyalkyl group is introduced into the cellulose molecule, an additional hydroxyl group is formed which itself is capable of hydroxyalkylation. As a result of this, side chains of considerable length may form on the cellulose molecule. The M.S./D.S. ratio represents the average length of these side chains. Thus, from the foregoing it will be seen that the D.S. of a cellulose derivative can be no higher than 3, whereas the M.S. may be considerably higher than 3, depending on the extent to which side chains are formed.

When a mixed ether is involved herein, the first value given is the D.S. and the second value given is the M.S. For example, regarding methyl hydroxypropyl cellulose in Table 3, the first value given is the methyl D.S. and the second value given is the hydroxypropyl M.S.

The two most widely used methods for determining M.S. are the Zeisel-Morgan method and the terminal methyl method. The Zeisel-Morgan method is reported beginning at page 500, vol. 18, 1946, of Industrial and Engineering Chemistry, Analytical Edition. The terminal methyl method is reported by Lemieux and Purves beginning at page 485, vol. 25B, 1947, of Canadian Journal of Research. Some are of the opinion that perhaps the latter method is somewhat more accurate. However all those skilled in the art realize that is it quite difficult to obtain a high degree of accuracy in determining M.S. at high M.S. levels, and that the accuracy of neither of these methods is as high as desired. At first, after experiencing some difficulty in determining some M.S. values herein using the Zeisel-Morgan method, this method was discarded in favor of the terminal methyl method. Thus, substantially all of the M.S. values given herein were determined by the terminal methyl method. This explanation is being given in order to make it clear that although the M.S. values herein may not be highly accurate, they were determined by the most accurate methods known.

Contrary to what the artisan would expect from the prior art, carrying out the process as disclosed hereinbefore gives a hydroxypropyl cellulose product which (1) has excellent solubility in water, (2) has excellent thermoplasticity, and (3) is also soluble in a large number of polar organic solvents, typical examples of which are given in column 6 hereinafter. The M.S. of the hydroxypropyl cellulose has an important influence on these properties. Thus, as to water solubility, the temperature at which the hydroxypropyl cellulose becomes insoluble in water varies inversely with M.S. For instance the hydroxypropyl cellulose of M.S. 2 does not become insoluble in water until the water reaches a temperature of about 60° C., whereas the hydroxypropyl cellulose of M.S. 4 becomes insoluble in water when the water reaches a temperature of about 40° C. Stated in another way, the hydroxypropyl cellulose of M.S. 2 is soluble in water up to a temperature of about 60° C. but insoluble in water above a temperature of about 60° C. whereas the hydroxypropyl cellulose of M.S. 4 is soluble in water up to a temperature of about 40° C. but insoluble in water above a temperature of about 40° C. The thermoplasticity of the hydroxypropyl cellulose and its solubility in polar organic solvents vary directly with M.S. It also must be kept in mind that solubility in water and polar organic solvents, and degree of thermoplasticity vary inversely with viscosity. Thus, the M.S. desired will depend on the use to be made of the hydroxypropyl cellulose. For some uses, hydroxypropyl cellulose of relatively low M.S. is more desirable, whereas for other uses hydroxypropyl cellulose of higher M.S. is preferred.

Water-miscible inert organic diluents applicable in the present invention includes 3–5 carbon atom aliphatic alcohols; ketones, e.g. acetone, methyl ethyl ketone; dioxane; tetrahydrofuran.

One of the essential and very important conditions of the present invention is that excess liquid be removed from the alkali cellulose after the alkali cellulose period and before the hydroxypropylation period, otherwise I have found that a number of serious difficulties are encountered. By removing "excess" liquid from the alkali cellulose after the alkali cellulose period and before the hydroxypropylation reaction, is meant that the liquid is removed to a press ratio of 2–5 and preferably to a press ratio of 2.5–3.5. "Press ratio," as is well understood in the art, is the ratio of the weight of the alkali cellulose after removing excess liquid to the air-dry weight of the starting cellulosic material. Since the excess liquid is usually removed by filtration or centrifugation, press ratio is usually expressed as the ratio of the weight of the filter cake to the weight of the cellulose.

One of the serious difficulties encountered if one does not remove excess liquid in accordance with the present invention, as discussed above, is that the efficiency of the hydroxypropylation reaction is substantially below that desired for commercial operation. A still further difficulty is that the hydroxypropyl cellulose product disperses in the excess liquid and is therefore difficult to recover from the reaction mixture. By removing excess liquid from the alkali cellulose I have found that the foregoing difficulties are either eliminated or minimized; that is, the efficiency of the hydroxypropylation reaction is quite satisfactory for commercial operation, the hydroxypropylation reaction is very uniform and a commercially acceptable one which produces hydroxypropyl cellulose in granular form and therefore is easy and economical to recover from the reaction mixture and purify, and the hydroxypropyl cellulose product dissolves readily to form smooth and clear aqueous solutions.

The diluents employed in the present invention are of such hydrophilic nature that they hold a considerable amount of the water present at the end of the alkali cellulose period, so that when the excess liquid is removed from the alkali cellulose there is removed not only the diluent but also a substantial amount of water. This leaves the alkali on the cellulose (which has been uniformly distributed thereon during the alkali cellulose period) in a far more concentrated state than it would have otherwise been to serve as a catalyst during the hydroxypropylation reaction. This in turn enables the effective use of a far lower alkali/cellulose ratio than the prior art has been able to use.

Thus another essential and very important condition of the present invention is the use of an unusually low alkali/cellulose ratio, namely .02—.5 and preferably .05–.5.

Still another necessary condition of the present invention is that the hydroxypropylation reaction be continued until the M.S. of the hydroxypropyl cellulose product has reached at least 2 and preferably 2–10. Particularly desirable for many uses is a hydroxypropyl cellulose product having an M.S. of 3–5.

A feature of the present process which is particularly attractive from a commercial standpoint is the ability to purify the hydroxypropyl cellulose product in hot water instead of the far more expensive organic purification solvents of the prior art. Notwithstanding this desirable property from a process standpoint, the hydroxypropyl cellulose product of the present invention is very soluble in cold water, the latter property being very desirable or necessary for many uses.

The following examples illustrate specific embodiments of the present invention. These examples are not intended to restrict the present invention other than as defined in the appended claims. In these examples parts and percent are by weight and ratio is parts by weight unless otherwise indicated. All viscosities herein were measured with a standard Brookfield Synchro-Lectric LVF viscometer on aqueous solutions at 25° C. of the concentrations specified, unless otherwise indicated.

EXAMPLES 1–8

*Effect of NaOH/cellulose ratio*

A slurry of 1 part of finely cut wood pulp in 10 parts of tertiary butanol, 1.3 parts of water and 0.1 part of NaOH was stirred for one hour at room temperature. Then the excess liquid was filtered off by means of suction, leaving a filter cake weighing 3.0 parts. This alkali cellulose cake was broken up and heated in a pressure vessel together with propylene oxide for 16 hours at 70° C. while tumbling the vessel end over end, the propylene oxide/cellulose ratio being 2.5. The product was a solid which was added in small increments to vigorously boiling water, the tertiary butanol flashing off. The slurry was kept acidic to phenolphthalein by addition of 85% $H_3PO_4$ in small amounts as needed. The pH of the slurry was finally adjusted to 7.0, the product was washed substantially free of salt impurities with hot water (85° C.–95° C.), the water was decanted and the product dried at 130° C. using a two-roll drum drier. At room temperature the resulting product had excellent solubility in water, in anhydrous methanol and in anhydrous ethanol. Its hydroxypropyl M.S. was 3.5, and the Brookfield viscosity of a 2% aqueous solution at 25° C. was 16.5 cps. (see Example 3, in Table 1 below).

Additional experiments (Examples 1, 2 and 4 to 8 in Table 1 below) were carried out using the same conditions as described above for Example 3, except that the NaOH/cellulose ratio was different for each example.

From these experiments it will be seen that the best etherification efficiency was obtained at a NaOH/cellulose ratio of 0.1 which is far lower than would be expected from the optimum NaOH/cellulose ratio for the hydroxyethylation of cellulose.

TABLE 1.—EFFECT OF NaOH/CELLULOSE RATIO

| Example | 1 | 2 | 3 | 4 | 5 | 6 | 7 | 8 |
|---|---|---|---|---|---|---|---|---|
| NaOH/Cellulose | 0.02 | 0.05 | 0.10 | 0.20 | 0.24 | 0.30 | 0.40 | 0.50 |
| Press ratio | 3.0 | 3.0 | 3.0 | 3.0 | 3.0 | 3.0 | 3.0 | 3.0 |
| Hydroxypropyl, M.S. | 1.33 | 3.08 | 3.50 | 3.24 | 2.83 | 2.50 | 2.10 | 2.01 |
| Etherification efficiency,[1] percent | 17.8 | 41.0 | 46.8 | 43.3 | 37.8 | 33.4 | 28.0 | 27.0 |
| $H_2O$ solubility [2] | Poor | Fair | Good | Good | Good | Good | Good | Good |

[1] The formula for calculating etherification efficiency is:

$$\text{Etherification Efficiency} = 100 \times \frac{\frac{\text{M.S. Found}}{\text{Moles propylene oxide}}}{\text{Moles cellulose}}$$

[2] 2% Concentration at 25° C.

EXAMPLES 9–15

*Various water-miscible diluents*

In these examples a slurry of 20 grams finely cut wood pulp in 260 ml. diluent and the indicated amounts of NaOH and water was stirred for one hour at room temperature. Then 220 ml. of liquid was filtered from the resulting alkali cellulose. The resulting alkali cellulose cake was broken up and heated in a pressure vessel together with propylene oxide for 16 hours at 70° C. while tumbling the vessel end over end, the propylene oxide/cellulose ratio being 2.5. The product was a solid which was added in small increments to vigorously boiling water. The slurry was kept acidic to phenolphathalein by addition of 85% $H_3PO_4$ in small amounts as needed. The pH of the slurry was finally adjusted to 7.0, the product was washed substantially free of salt impurities with hot water (85° C.–95° C.), the water was decanted and the product dried at 130° C. using a two-roll drum drier. Except for ethyl alcohol, all of these diluents gave satisfactory results in accordance with the present invention. Further details appear in Table 2 below.

TABLE 2.—VARIOUS WATER-MISCIBLE DILUENTS

| Example | Diluent | NaOH/Cellulose | $H_2O$/Cellulose | Press ratio | M.S. |
|---|---|---|---|---|---|
| 9 | Ethyl alcohol | 0.1 | 1.1 | 3.58 | 0.97 |
| 10 | Isopropyl alcohol | 0.1 | 1.1 | 3.11 | 3.15 |
| 11 | do | 0.3 | 1.3 | 3.51 | 2.95 |
| 12 | Tertiary butyl alcohol | 0.3 | 1.3 | 3.39 | 2.50 |
| 13 | Amyl alcohol | 0.3 | 1.3 | 3.89 | 1.94 |
| 14 | Dioxane | 0.3 | 1.3 | 4.12 | 2.33 |
| 15 | Acetone | 0.3 | 1.3 | 3.19 | 2.34 |

While the process according to this invention set forth hereinbefore gives very good results, according to another embodiment of the present invention a second diluent is used during the etherification period. That is, at the end of the alkali cellulose period excess liquid is removed from the alkali cellulose, e.g. by filtration, and the resulting alkali cellulose cake is slurried in the second diluent and the alkali cellulose is etherified in the presence of this second diluent. The use of this second diluent gives somewhat greater assurance that the hydroxypropyl cellulose product will remain in the solid fibrous state of the starting cellulosic material, thus aiding in its purification and recovery. If the hydroxypropyl cellulose product should form a gel or dissolve in the reaction mixture it would be more difficult to purify and recover. The following examples illustrate the foregoing use of a second diluent during the etherification period.

EXAMPLE 16

Use of second diluent

A slurry of 1 part finely cut wood pulp in 10 parts tertiary butanol, 1.3 parts water and 0.2 part of 50% aqueous solution of NaOH was stirred for one hour at 20° C. The slurry was prepared by adding the NaOH to a mixture of the pulp, tertiary butanol and water while stirring. Then the excess liquid was filtered off by means of suction, leaving a filter cake weighing 3.2 parts. This alkali cellulose filter cake was broken up and added to a pressure vessel along with 7.8 parts hexane and 2.55 parts propylene oxide and heated for 16 hours at 70° C. while tumbling the vessel end over end. The hydroxypropyl cellulose product was a solid suspended in the hexane. The excess hexane was filtered off and the filter cake was added to vigorously boiling water, the residual hexane and tertiary butanol flashing off. The slurry was kept acidic to phenolphthalein by addition of 85% $H_3PO_4$ in small amounts as needed. The pH of the slurry was finally adjusted to 7.0, the product washed substantially free of salt impurities with hot water (85° C.–95° C.), the water decanted and the product dried at 130° C. using a two-roll drum drier. At room temperature the resulting product had excellent solubility in water. Its M.S. was 3.26, which corresponds to a propylene oxide etherification efficiency of 43.5%. The Brookfield viscosity of a 2% aqueous solution of the hydroxypropyl cellulose product at 25° C. was 47 cps.

EXAMPLE 17

Use of second diluent

Although this example represents using a second diluent as in Example 16, the main objective was to make a hydroxypropyl cellulose product of appreciably higher viscosity, and for this reason cotton linters of very high molecular weight was used instead of wood pulp.

Charge

|   | Parts |
|---|---|
| Purified cotton linters | 1 |
| Tertiary butanol | 10 |
| Water | 1.4 |
| Sodium hydroxide | 0.1 |
| Hexane | 9.5 |
| Propylene oxide | 2.85 |

Procedure

The tertiary butanol, water and sodium hydroxide were mixed and the mixture cooled to 20° C. The purified cotton linters were added to the mixture and aged at 20° C. for one hour while stirring. Excess liquid was filtered off the resulting alkali cellulose so that the resulting alkali cellulose filter cake weighed 3.08 parts. This filter cake was broken up and slurried in the hexane, placed in a pressure vessel the pressure of which was increased to 100 p.s.i.g. with nitrogen, and then the pressure was vented to 5 p.s.i.g. The propylene oxide was added to the pressure vessel and then the pressure was increased to 25 p.s.i.g. with nitrogen. The resulting charge was heated to 85° C. in 30 minutes and then reacted at this temperature and 25 p.s.i.g. pressure for 6 hours. The charge was cooled to 30° C., the pressure vessel vented and .14 part of glacial acetic acid added. The excess hexane was filtered off from the resulting hydroxypropyl cellulose product, the product was purified by washing with hot water (85° C.–95° C.) and then dried at 130° C. using a two-roll drum drier. At room temperature the resulting hydroxypropyl cellulose product had excellent solubility in water and its aqueous solution was quite clear. The M.S. of the product was 2.81 and its ash content was nil. The Brookfield viscosity of a 1% aqueous solution of the product at 25° C. was 2,500 cps.

From the foregoing it will be seen that when a second diluent is employed one or more of the diluents disclosed in the second paragraph in column two of the present application is used during the alkali cellulose period, then the excess liquid is filtered off or otherwise removed and the resulting filter cake is mixed with the second diluent and the alkali cellulose is etherified in the presence of the second diluent. The second diluent may be any liquid which is substantially inert in the system and which does not dissolve the hydroxypropyl cellulose product in the system to any substantial extent. Examples of liquids are ethers, aliphatic or aromatic or alicyclic hydrocarbons. More specifically such liquids include, e.g. dibutyl ether, diisopropyl ether, hexane, heptane, benzene, toluene, xylene and cyclohexane. One of the main functions which the second diluent performs is to make it easier to control the hydroxypropylation reaction which is exothermic and it does this (1) by diluting the propylene oxide and thereby making it less reactive without adversely affecting the hydroxypropylation efficiency and (2) by absorbing the heat of the reaction.

EXAMPLE 18

Solubility properties

The hydroxypropyl cellulose products of the present invention have unexpected and beneficial solubility properties. In carrying out these solubility tests 1 gram of the hydroxypropyl cellulose product and 49 cc. of the solvent being tested was placed in a bottle and the bottle tumbled end over end 24 hours at room temperature. The hydroxypropyl cellulose tested had an M.S. of 3.1 and a viscosity of 2000 cps. as measured by a Brookfield viscometer on a 2% aqueous solution of the hydroxypropyl cellulose at 25° C.

The hydroxypropyl cellulose completely dissolved in the following solvents:

Water
Methyl alcohol
Ethyl alcohol
Formic acid
Methylene chloride-methanol mixture (9/1 by volume)
Dimethyl sulfoxide
Dimethyl formamide
Ethylene chlorohydrin
Acetic acid
Pyridine The hydroxypropyl cellulose product gave stable dispersions in the following solvents:

Tertiary butyl alcohol
Isopropyl alcohol
Propylene glycol
Cellosolve[1]

EXAMPLE 19

Equilibrium moisture content

Contrary to what the artisan would expect, the hydroxypropyl cellulose product of the present invention was found to have a very low equilibrium moisture content and therefore to be exceptionally resistant to blocking. A material having a low equilibrium moisture content is important for many uses, e.g. in films. If the equilibrium moisture content is high the films will adhere to each other and to other objects upon contact even under only slight pressure and moderately high humidity. This is referred to as blocking. These conditions occur when films are stacked in storage or in shipment. Blocking is especially bad under the high relative humidity conditions to which the films are subjected in the summer months in many localities.

---

[1] That is, the monoethyl ether of ethylene glycol.

The equilibrium moisture content was determined on the hydroxypropyl cellulose of the present invention and other water-soluble cellulose ethers as follows. Films 2 mils thick were cast on glass plates from 5% aqueous solutions of the cellulose ethers and allowed to dry 24 hours at room temperature. The films were stripped from the glass plates and allowed to dry further at room temperature for several days. Then the films were suspended in a constant humidity chamber for 72 hours at the relative humidity and temperature shown in Table 3 hereinafter. The films were removed from the constant humidity chamber, weighed, dried 16 hours in vacuo at 80° C., dried an additional 4 hours at 100° C., and finally weighed again. From the data thus obtained the equilibrium moisture content of the films was calculated as follows:

$$\text{Percent water} = \frac{\text{weight conditioned minus weight dry}}{\text{weight dry}} \times 100$$

Further details appear in Table 3 hereinafter.

TABLE 3.—EQUILIBRIUM MOISTURE CONTENT

| Cellulose Ether | D.S. | M.S. | Equilibrium Moisture Content at 25° C. | |
|---|---|---|---|---|
| | | | 50% RH | 84% RH |
| Hydroxypropyl cellulose | | 3.1 | 3.2 | 10.2 |
| Do | | 2.2 | 5.1 | 11.1 |
| Methyl cellulose | 1.66 | | 6.2 | 15.5 |
| Methyl hydroxypropyl cellulose | .16 | 1.29 | 6.7 | 17.3 |
| Hydroxyethyl cellulose | | 2.80 | 6.7 | 31.1 |
| Carboxymethyl cellulose | .82 | | 16.7 | 37.6 |

The higher relative humidity conditions in Table 3 above are more representative of the conditions encountered in many localities in the summer months, and under these conditions materials having an equilibrium moisture content of about 15 or higher blocked badly, whereas the hydroxypropyl cellulose products of the present invention showed no tendency to block under these same high humidity conditions. This is quite unpredictable, and especially so with respect to hydroxyethyl cellulose which is the next member to hydroxypropyl cellulose in the same homologous series of compounds. As will be seen, the hydroxypropyl cellulose products of the present invention are substantially better than any prior art compounds tested and hydroxyethyl cellulose is among the worst of the prior art compounds tested.

EXAMPLE 20

Plastic flow

The plastic flow properties of the hydroxypropyl cellulose products of the present invention and of prior art materials were determined under the application of heat and pressure in an Olsen Bakelite flow tester. This is a standard testing device widely used in the plastics industry. It is described in ASTM method D 569–46A (ASTM Standards, 1958, Part 9, page 393). This device is perhaps more often referred to in the art at the Tinius Olsen flow tester.

For these plastic flow tests the cellulose ether was fused into a plastic mass by heat and pressure. This mass was ground to a fine powder and conditioned at 25° C. and 50% R.H. for about 24 hours. Cylindrical pellets ⅜" x ⅜" were formed from this powder in a pelleting machine. The pellets were placed in the Tinius Olsen flow tester and the plastic flow thereof measured under the conditions shown in Table 4 hereinafter.

As will be seen from Table 4 hereinafter, the hydroxypropyl cellulose products of the present invention exhibited far better plastic flow properties than the prior art methyl hydroxypropyl cellulose, which is a commercially available water soluble ether.

An attempt was also made to determine the plastic flow properties of commercially available hydroxyethyl cellulose (2.50 M.S. and substantially the same viscosities as the hydroxypropyl cellulose products in Table 4) using the same flow conditions in Table 4, but this was unsuccessful. The hydroxyethyl cellulose came out of the orifice in the form of crumbs, i.e. it did not weld or fuse together. In order to obtain plastic flow in the sense the term is used in the art and in the present application, the material being tested must weld; that is, the material must flow from the orifice of the extruder as a continuous piece.

The unusual properties of the hydroxypropyl cellulose products of the present invention render them particularly desirable in a large number of applications. Some of the applications in which these hydroxypropyl cellulose products can be used to decided advantage over prior art materials will now be given by way of actual examples.

Further details regarding the plastic flow properties of the hydroxypropyl cellulose products of the present invention and how these properties were determined appear in Table 4 hereinafter.

TABLE 4.—EXAMPLE 20

| Cellulose Ethers | D.S. | M.S. | Viscosity | | Extrusion | | Flow, in./2 mins. |
|---|---|---|---|---|---|---|---|
| | | | Conc., percent | Cps. | Temp., ° C. | Pressure, p.s.i. | |
| Hydroxypropyl cellulose | | 3.50 | 2 | 1,800 | 130; 150 | 500 / 500 | .84 / 3.8 |
| Methyl hydroxypropyl cellulose | 1.76 | .16 | 2 | 400 | 150; 160 | 500 / 500 | .03 / .06 |
| Hydroxypropyl cellulose | | 3.31 | 2 | 100 | 140; 150 | 500 / 500 | .7 / 1.28 |
| Methyl hydroxypropyl cellulose | 1.70 | .20 | 2 | 50 | 150; 170 | 500 / 500 | .12 / .65 |

EXAMPLE 21

Non-curling rewettable adhesive formulations

There are a number of applications in which such adhesives are used, one such large use being on envelopes. These formulations include a primary adhesive, a binder for the primary adhesive (the binder sometimes being called a secondary adhesive), and an organic liquid which is a solvent for the binder but a nonsolvent for the primary adhesive. The problem involved in order to avoid curling of the paper, or whatever other substrate is used, is insuring that the primary adhesive appears on the paper in the form of discrete particles instead of in the form of a continuous film. It has been found that the hydroxypropyl cellulose products of the present invention are excellent binders in these formulations, as illustrated by the following.

To a stirred slurry of 20 grams corn dextrin (as the primary adhesive) in 95 ml. of 2B alcohol (95% denatured) was added 6 grams of hydroxypropyl cellulose (as the binder) and 15 ml. water. The hydroxypropyl cellulose had an M.S. of 3.5 and its 2% aqueous solution had a viscosity of 17 cps. The hydroxypropyl cellulose dissolved to give a smooth and viscous suspension of dextrin particles. From this suspension both 6 mil and 10 mil thick films (measured wet) were cast on paper and allowed to dry at room temperature. This produced a coating in which the dextrin particles were well bound to the paper by the hydroxypropyl cellulose and could not be rubbed off. After standing at room temperature for over two months, the films showed no signs of curling or cracking. After rewetting the films, contacting them with another piece of paper and pulling apart, the separation occurred between the fibers of the paper instead of between the paper and the film (i.e., the paper tore). This is a standard adhesive test used for envelopes, and tearing of the paper indicates excellent adhesion.

Additional experiments were carried out using substantially the same conditions as Example 21 hereinbefore except that anhydrous methyl alcohol, ethyl alcohol and isopropyl alcohol (separately) were substituted for the 2B alcohol and several different ratios of primary adhesive to binder were used. All these experiments gave satisfactory results.

EXAMPLE 22

Paint removers

It has been found that the unusual properties of the hydroxypropyl cellulose products of the present invention render them quite satisfactory as thickeners in paint remover formulations.

It is desirable that a paint remover formulation contain a thickener so that a thick coating of the paint remover can be applied to and maintained at the surface of the paint to be removed. In addition to thickeners paint remover formulations contain a material to swell and dissolve or soften the film of paint so that the paint can be readily scraped off or flushed off. Paint remover formulations also often contain a number of other materials for various purposes.

One of the hydroxypropyl cellulose products of the present invention was incorporated in a known paint remover formulation, the resulting formulation being designated hereinafter as Formulation No. 1 (scrape off). This Formulation No. 1 is designed for use where one desires to scrape off the paint after treating it with the formulation. Another hydroxypropyl cellulose product of the present invention was incorporated into a second known paint remover formulation, the resulting formulation being designated hereinafter as Formulation No. 2 (flush off). This Formulation No. 2 is designed for use where one desires to flush off the paint after treating it with the formulation.

These two different type formulations are given in Table 5 hereinafter.

TABLE 5

| Ingredient | Formulation No. 1 (Scrape-off) | Formulation No. 2 (Flush-off) |
| --- | --- | --- |
| Methylene chloride, ml | 91 | 136 |
| Toluene, ml | 3.8 | |
| Paraffin, g | 2.5 | 3.0 |
| Hydroxypropyl cellulose, g | 2.0 | 2.0 |
| Methanol, ml | 15.0 | 15.0 |
| Talloil soap,[1] g | 7.7 | |
| Di-triisopropanol amine,[2] ml | 12.2 | |
| 40% ethyl alcohol solution of triethyl-ammonium phosphate, ml | 0.8 | |
| Water, ml | 1.9 | |

[1] This material is commercially available under the trade name "Nopco Soap C."
[2] That is, a commercially available mixture of diisopropanol amine and triisopropanol amine which is given in the literature as "Di-triisopropanol amine."

Table 6 hereinafter gives the pertinent properties of each of the hydroxypropyl cellulose products used and also the viscosity of each of the final paint remover formulations in Table 5 above.

TABLE 6

| | M. S. | Aqueous Viscosity | | Formulation Viscosity, cps. |
| --- | --- | --- | --- | --- |
| | | Conc., percent | Cps. | |
| Formulation No. 1 (Scrape-off) | 3.27 | 2 | 1,800 | 1,310 |
| Formulation No. 2 (Flush-off) | 3.11 | 1 | 1,000 | 3,960 |

Both formulations performed well in removing various types of paints.

As those skilled in this art will appreciate many variations may be made in the above conditions within the scope of this invention defined in the appended claims.

The cellulosic material used in this invention may be any suitable source of reactive cellulosic material, such as cotton cellulose, purified cotton linters or wood pulp or others. Although not necessary in the practice of this invention, it is desirable to employ cellulose which has been comminuted to a particle size sufficiently small to pass through the openings in a standard 35-mesh sieve or screen. Such comminuted cellulose has the advantage that it can be readily and uniformly suspended in the inert organic slurrying medium with substantially no tendency for the fibrous cellulosic particles to mat or felt together in the suspension or slurry into agglomerates. Moreover, the smaller the individual cellulosic particles are, the higher the percentage by weight of cellulose which can be suspended satisfactorily in the slurrying medium of this invention, up to a working limit of about 20% by weight of cellulose. Comminution may be accomplished by any suitable comminution means, such as knife mills, hammer mills, ball mills, paper beaters, Jordan engines, attrition mills, and others. If desired, however, ordinary shredded cotton linters or shredded wood pulp, or even staple cotton can be employed instead of comminuted cellulose. With shredded cellulose or staple cotton, however, the maximum amount of cellulose which can be satisfactorily suspended or slurried without encountering excessive matting together of fibers in the slurry is on the order of about 3.5% by weight of cellulose.

While it is preferable to use propylene oxide as the etherifying agent other materials are applicable, e.g. propylene chlorohydrin.

Various alkalies are applicable, including alkali metal hydroxides, e.g. sodium hydroxide, potassium hydroxide, and organic bases, e.g. trimethyl benzyl ammonium hydroxide, dimethyl dibenzyl ammonium hydroxide, tetramethyl ammonium hydroxide.

Various types of drying methods are applicable for drying the hydroxypropyl cellulose products of the present invention, e.g. drum drying, spray drying, superheated steam drying, and vented extruder drying.

Good results are obtained in accordance with this invention using a diluent/cellulose ratio of 5–20, preferably 8–12, in the alkali cellulose period and 1–5 in the etherification period; this applies where no second diluent is employed in the etherification period. However, where a second diluent is employed in the etherification period (see Examples 16 and 17 hereinbefore), the total diluent/cellulose ratio may be 5–20, preferably 8–12; in other words the amount of the second diluent used should be such that it, plus any diluent remaining in the alkali cellulose filter cake at the end of the alkali cellulose period is equal approximately to the amount of diluent used in the alkali cellulose period. Good results are obtained in accordance with this invention using a water/cellulose ratio of 0.5–5, preferably 1–2, in the alkali cellulose period and 0.3–2 in the etherification period. As is conventional practice, the water given herein in the water/cellulose ratios includes the water added as such plus the water in the alkali, but does not include the water in the cellulose (usually about 5% based on the bone dry weight of the cellulose). Although there is no upper ratio of propylene oxide/cellulose which one could use during the etherification period, normally this ratio will not exceed about 10 for practical reasons. Preferably the propylene oxide/cellulose ratio will be 1–10, and specifically preferred is 2.5–5.

The order in which the several ingredients are brought together into contact with each other in the alkali cellulose period is immaterial. For example, part or all of the water and/or part or all of the alkali can be introduced into the diluent prior to mixing with the cellulose. On the other hand, if desired, the cellulose can be mixed with the diluent after which the alkali and water can be added, either separately in either order or together. If desired, part or all of the water can be mixed with the diluent prior to mixing with the cellulose, after which the alkali and any additional water can then be added, either together or separately in either order. If desired, the water can be added to the cellulose prior to mixing with the diluent, or the water may be distributed in any manner between the diluent, the cellulose and the alkali. The alkali may be added as solid caustic or in aqueous solution. If added as solid caustic, sufficient additional time is required for the caustic to dissolve in the water present in the system. A procedure sometimes used comprises suspending a given weight of cellulose of known moisture content in a predetermined weight of diluent of known moisture content while agitating, after which a predetermined weight of an aqueous caustic alkali solution of known concentration, together with any additional water required is added to the system while agitating. The alkali cellulose time may vary widely, depending largely on temperature. Preferably the temperature of the alkali cellulose mixture will be maintained at about 0° C.–35° C. throughout an alkali cellulose period of about 5 minutes to 3 hours.

The etherification time and temperature may vary considerably within the scope of the present invention and they vary inversely. Thus, for example, the etherification reaction can be carried out at a temperature of about 20° C.–150° C. for about 15 minutes to 48 hours. Preferably the etherification reaction would be carried out at a temperature of about 65° C.–95° C. for a period of about 5–16 hours. The time of the etherification reaction varies inversely with temperature being relatively long at a low temperature such as 20° C. and being substantially shorter at a high temperature such as 150° C.

One of the outstanding advantages of the present invention is that it is quite easy to purify and recover the hydroxypropyl cellulose product. At the end of the etherification reaction the crude hydroxypropyl cellulose product appears in the reaction mixture in a somewhat swollen condition since it is swollen e.g. by such materials as cold water (below about 40° C.), tertiary butanol, and propylene glycol. Preferably, then, the first step in the purification process is to separate the product from the reaction mixture so that it can be more readily purified. A preferred method of separation is to add the reaction mixture to vigorously stirred hot water (preferably about 85° C.–95° C.). This precipitates the hydroxypropyl cellulose product and flashes off volatile materials which are recovered. This changes the product from a somewhat swollen condition to a granular easily handled material. Another separation method which has been found to work satisfactorily involves passing live steam through the reaction mixture followed by washing with hot water. Those skilled in the art will appreciate that various other techniques can be used to accomplish this separation. Purification by washing with hot water brings the granular hydroxypropyl cellulose product to almost a nil ash content. Washing the granular product by steeping and decanting has proven quite successful. Of course, any of the usual countercurrent washing procedures may also be used. Preferably the wash water temperature will be at least 70° C., and more specifically preferred is a wash water temperature of at least 85° C. If the wash water temperature is too low, the product is not as easily separated therefrom.

One of the materials used in the present process is an alkali which is a swelling agent and catalyst for the reaction. In the purification step after the etherification reaction has been completed, this alkali must be removed. It may be removed as such by hot water washing. However, it has been found to be more convenient to neutralize the alkali and wash out the resulting salts. As neutralizing agents any of the common acids may be used, e.g. phosphoric, acetic, hydrochloric, sulfuric or nitric acids. The best results have been obtained with phosphoric and acetic acids because better control may be obtained with these acids. Neutralization can be carried out on the crude reaction mixture or on the precipitated hydroxypropyl cellulose.

It is well known in the art how to obtain a water soluble cellulose ether of almost any desired viscosity within a very broad range of viscosities, and the usual techniques are applicable in the present invention. Viscosity reduction may be carried out at various stages, e.g. on the cellulosic material prior to any treatment in accordance with this invention, during the etherification reaction, on the crude hydroxypropyl cellulose product or on the final purified hydroxypropyl cellulose product. Suitable viscosity reducing agents include the hypohalites, such as the alkali metal hypobromites, hypochlorites, and hypoiodites; peroxides, such as hydrogen peroxide and the alkali metal peroxides; periodates, such as the alkali metal periodates; and permanganate. Metal hypochlorites, such as the alkali metal and alkaline earth metal hypochlorites, are ordinarily used, but other inorganic hypochlorites such as ammonium hypochlorite, can be used if desired. Generally, the preferred hypochlorite is sodium hypochlorite primarily because of its commercial availability. The amount of hypochlorite that is used depends on the desired viscosity of the final product and the time of treatment, and this amount can be expressed in terms of the amount of hypochlorite that is used normally will be sufficient to provide about 0.1%–6% available chlorine based upon the cellulose employed.

Conventional oxidation catalysts may also be used during the viscosity reduction, e.g. salts of cobalt, magnesium, iron, etc.

Of course, two variables which affect the viscosity reduction are treatment time and the viscosity reduction agent concentration or ratio of viscosity reduction agent to cellulose ether. Treatment time and viscosity reduction concentration vary inversely. Also, elevated temperature enhances viscosity reduction efficiency and rate. Although viscosity reduction temperatures outside the range of 40° C.–100° C. are applicable, they are less practical. Thus, any viscosity needed is obtainable. Generally the viscosity of the hydroxypropyl cellulose for most uses will range from a 5% viscosity of about 25 cps. to a 1% viscosity of about 3000 cps.

Where specific amounts of alkali are referred to herein, the basis is sodium hydroxide. As those skilled in the art will readily appreciate, these amounts will vary when other alkalies are substituted for sodium hydroxide. Where the concentration of the alkali is not specified herein, it is substantially 100% sodium hydroxide.

Since they are well known in the art many of the variables disclosed herein are disclosed for the sake of clarity and completeness and not as limitations on the present invention. This applies to such variables, e.g. as alkali cellulose and etherification time and temperature, the order of adding the reactants, the type of cellulosic material used and its physical state, the viscosity of the hydroxypropyl cellulose, viscosity reduction or control, the alkali used and its concentration, and means of removing the alkali from the hydroxypropylation reaction mixture.

Unless otherwise indicated herein, the ratios given apply to both the alkali cellulosic period and the etherification period.

As many apparent and widely different embodiments of this invention may be made without departing from the spirit and scope thereof, it is to be understood that the invention is not limited to the specific embodiments thereof except as defined in the appended claims.

What I claim and desire to protect by Letters Patent is:

1. As a new compound hydroxypropyl cellulose having an M.S. of at least 2 and further characterized by being soluble in cold water, insoluble in hot water, soluble in polar organic solvents, and thermoplastic.

2. Process of preparing hydroxypropyl cellulose having an M.S. of at least 2, which process comprises mixing cellulosic material, alkali, water and a water-miscible inert organic diluent other than propylene oxide removing excess liquid from the resulting alkali cellulose, and then causing the alkali cellulose to react with propylene oxide, the alkali/cellulose ratio being .02–.5, the water/cellulose ratio being 0.5–5 and 0.3–2 in the alkali cellulose period and etherification period respectively.

3. Process of claim 2 wherein the alkali/cellulose ratio is .05–.5.

4. Process of preparing hydroxypropyl cellulose having an M.S. of at least 2, which process comprises mixing cellulosic material, alkali, water and a water-miscible inert organic diluent other than propylene oxide, removing excess liquid from the resulting alkali cellulose to a press ratio of 2–5, and then causing the alkali cellulose to react with propylene oxide, the alkali/cellulose ratio being .02–.5, the water/cellulose ratio being 0.5–5 and 0.3–2 in the alkali cellulose period and etherification period respectively.

5. Process of claim 4 wherein the alkali/cellulose ratio is .05–.15.

6. Process of claim 4 wherein the diluent is tertiary butyl alcohol.

7. Process of claim 4 wherein the press ratio is 2.5–3.5.

8. Process of preparing hydroxypropyl cellulose having an M.S. of at least 2, which process comprises mixing cellulosic material, alkali, water and a water-miscible inert organic diluent other than propylene oxide, removing excess liquid from the resulting alkali cellulose, and then causing the alkali cellulose to react with propylene oxide in the presence of a second inert organic diluent which is a nonsolvent for the hydroxypropyl cellulose product, the alkali/cellulose ratio being .02–.5, the water/cellulose ratio being 0.5–5 and 0.3–2 in the alkali cellulose period and etherification period respectively.

9. Process of preparing hydroxypropyl cellulose having an M.S. of at least 2, which process comprises mixing cellulosic material, alkali, water and a water-miscible inert organic diluent other than propylene oxide, removing excess liquid from the resulting alkali cellulose to a press ratio of 2–5, and then causing the alkali cellulose to react with propylene oxide in the presence of a second inert organic diluent which is a nonsolvent for the hydroxypropyl cellulose product, the alkali/cellulose ratio being .02–.5, the water/cellulose ratio being 0.5–5 and 0.3–2 in the alkali cellulose period and etherification period respectively.

10. Process of claim 9 in which the second inert organic diluent is hexane.

11. Process of claim 9 in which the press ratio is 2.5–3.5.

12. Process of preparing hydroxypropyl cellulose having an M.S. of 3–5, which process comprises mixing cellulosic material, sodium hydroxide, water and tertiary butyl alcohol, removing excess liquid from the resulting alkali cellulose to a press ratio of 2.5–3.5, and then causing the alkali cellulose to react with propylene oxide in the presence of hexane, the alkali/cellulose ration being .05–.15, the water/cellulose ratio being 0.5–5 and 0.3–2 in the alkali cellulose period and etherification period respectively.

13. As a new compound hydroxypropyl cellulose having an M.S. of 2–10 and further characterized by being soluble in cold water, insoluble in hot water, soluble in polar organic solvents, and thermoplastic.

14. As a new compound hydroxypropyl cellulose having an M.S. of 3–5 and further characterized by being soluble in cold water, insoluble in hot water, soluble in polar organic solvents, and thermoplastic.

References Cited by the Examiner
UNITED STATES PATENTS

| | | | |
|---|---|---|---|
| 2,572,039 | 10/1951 | Klug | 260—231 |
| 2,667,481 | 1/1954 | Tasker | 260—232 |
| 3,070,451 | 12/1962 | Beaver et al. | 106—181 |
| 3,124,474 | 3/1964 | Beaver et al. | 106—189 |

LEON J. BERCOVITZ, *Primary Examiner.*

R. W. MULCAHY, *Assistant Examiner.*

UNITED STATES PATENT OFFICE
CERTIFICATE OF CORRECTION

Patent No. 3,278,521                                October 11, 1966

Eugene D. Klug

It is hereby certified that error appears in the above numbered patent requiring correction and that the said Letters Patent should read as corrected below.

Column 7, line 74, for "at" read -- as --; column 12, lines 40 and 41, beginning with "the amount" strike out all to and including "cellulose employed." in line 43, same column 12, and insert instead -- the available chlorine content of the hypochlorite. The amount of hypochlorite that is used normally will be sufficient to provide about 0.1%-6% available chlorine based upon the cellulose employed. --.

Signed and sealed this 29th day of August 1967.

(SEAL)
Attest:

ERNEST W. SWIDER                           EDWARD J. BRENNER
Attesting Officer                         Commissioner of Patents